United States Patent
Baughman et al.

(10) Patent No.: US 12,028,778 B2
(45) Date of Patent: Jul. 2, 2024

(54) CONTEXTUAL ENHANCEMENT OF USER SERVICE INQUIRIES

(71) Applicant: INTERNATIONAL BUSINESS MACHINES CORPORATION, Armonk, NY (US)

(72) Inventors: Aaron K. Baughman, Cary, NC (US); Micah Forster, Round Rock, TX (US); Shikhar Kwatra, San Jose, CA (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 17/652,772

(22) Filed: Feb. 28, 2022

(65) Prior Publication Data

US 2023/0276196 A1    Aug. 31, 2023

(51) Int. Cl.
*H04W 4/029* (2018.01)
*G01S 13/04* (2006.01)
*G06F 18/21* (2023.01)
*H04W 4/02* (2018.01)

(52) U.S. Cl.
CPC .......... *H04W 4/029* (2018.02); *G01S 13/04* (2013.01); *G06F 18/217* (2023.01); *H04W 4/025* (2013.01)

(58) Field of Classification Search
CPC ..... G06F 18/217; H04W 4/029; H04W 4/025; G01S 13/04; G06V 40/20; G06V 20/10
USPC ...................................................... 455/456.3
See application file for complete search history.

(56) References Cited

U.S. PATENT DOCUMENTS

| 9,318,108 B2 | 4/2016 | Gruber et al. |
| 9,443,536 B2 | 9/2016 | Cho et al. |
| 9,582,246 B2 * | 2/2017 | Klein ................. H04N 21/4222 |
| 10,241,752 B2 | 3/2019 | Lemay et al. |

(Continued)

FOREIGN PATENT DOCUMENTS

| CN | 102792320 B | 2/2016 | |
| WO | WO-2021226062 A1 * | 11/2011 | ........... G08G 1/0967 |

OTHER PUBLICATIONS

Grabham, "Amazon Echo Show 5 review: Honey, I shrunk the screen", Pocket-lint.com, Apr. 28, 2020, https://www.pocket-lint.com/smart-home/reviews/amazon/148502-echo-show-5-review, 18 pages.

(Continued)

*Primary Examiner* — Tanmay K Shah
(74) *Attorney, Agent, or Firm* — Kristofer L. Haggerty

(57) ABSTRACT

A computer-implemented method, a computer system and a computer program product refine service inquiries through an understanding of user context. The method includes receiving a service inquiry from a user on a computing device. The method also includes capturing movement data within a user environment. The movement data is selected from a group consisting of audio data, video data and telemetry data extracted from a second device in the user environment. The method further includes determining a user context by correlating motion and position of the user with respect to the user environment. In addition, the method includes generating a set of predicted modifications to the service inquiry based on the user context. Lastly, the method includes displaying the set of predicted modifications to the service inquiry on the computing device.

20 Claims, 4 Drawing Sheets

(56) References Cited

U.S. PATENT DOCUMENTS

| | | | |
|---|---|---|---|
| 10,304,463 | B2 | 5/2019 | Mixter et al. |
| 10,546,023 | B2 | 1/2020 | Ni et al. |
| 10,795,528 | B2 | 10/2020 | Dykstra-Erickson et al. |
| 2014/0258857 | A1 | 9/2014 | Dykstra-Erickson |
| 2018/0060728 | A1 | 3/2018 | Shan et al. |
| 2018/0349472 | A1 | 12/2018 | Kohlschuetter et al. |
| 2019/0142305 | A1* | 5/2019 | Tan .................... G08B 21/0272 600/595 |
| 2020/0357414 | A1 | 11/2020 | Park et al. |

OTHER PUBLICATIONS

Mell et al., "The NIST Definition of Cloud Computing", National Institute of Standards and Technology, Special Publication 800-145, Sep. 2011, 7 pages.

* cited by examiner

CONTEXTUAL ENHANCEMENT OF USER SERVICE INQUIRIES

BACKGROUND

Embodiments relate generally to the field of intelligent automated assistants, and in particular to improving user input to automated systems through determination of user context.

In the present environment of online commerce, it may be common for users to access mobile devices and query software applications that may provide intelligent and advanced services to those users, e.g., searching for and purchasing a specific product or analyzing driving conditions and assisting in route selection, based on specific preferences. Direct user queries may require additional context about the environment surrounding the user at the time of the query, including information such as the location of the user or details about a user's movements while accessing a mobile device. Knowledge of this information may provide context to the query and may refine the search results or services provided to the user.

SUMMARY

An embodiment is directed to a computer-implemented method for refining service inquiries through an understanding of user context. The method may include receiving a service inquiry from a user on a computing device. The method may also include capturing movement data within a user environment. The movement data is selected from a group consisting of: audio data, video data and telemetry data extracted from a second device in the user environment. In addition, the method may include determining a user context by correlating motion and position of the user with respect to the user environment. The method may further include generating a set of predicted modifications to the service inquiry based on the user context. Lastly, the method may include displaying the set of predicted modifications to the service inquiry on the computing device.

In an embodiment, determining the user context may also include identifying an object that is detected within a preconfigurable distance of the computing device using an object recognition algorithm. In this embodiment, determining the user context may further include correlating motion and position of the object with respect to the user.

In a further embodiment, the method may include monitoring user interactions with the displayed set of predicted modifications to the service inquiry. In this embodiment, the method may also include transmitting a modified service inquiry to a server in response to the user selecting a predicted modification to the service inquiry from the set. The modified service inquiry merges the selected predicted modification with the service inquiry.

In another embodiment, displaying the set of predicted modifications to the service inquiry may include determining a confidence score for each predicted modification to the service inquiry in the set of predicted modifications and generating a display of the set of predicted modifications. In this embodiment, the display includes a distinct visual indication associated with the predicted modification to the service inquiry in the set having a highest confidence score.

In yet another embodiment, the method may include receiving a user profile, where the user profile includes historical user information relevant to the service inquiry. The method may also include determining a relationship between the predicted modification and the historical user information. Lastly, the method may include updating the confidence score of the predicted modification to the service inquiry based on the relationship.

In a further embodiment, displaying the set of predicted modifications may include arranging the set in a hierarchical structure based on the historical user information in the user profile.

In yet another embodiment, a reinforcement machine learning model that predicts modifications to queries based on motion and position of items and objects in an environment is used for generating the set of predicted modifications to the service inquiry.

In addition to a computer-implemented method, additional embodiments are directed to a system and a computer program product for refining service inquiries through an understanding of user context.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
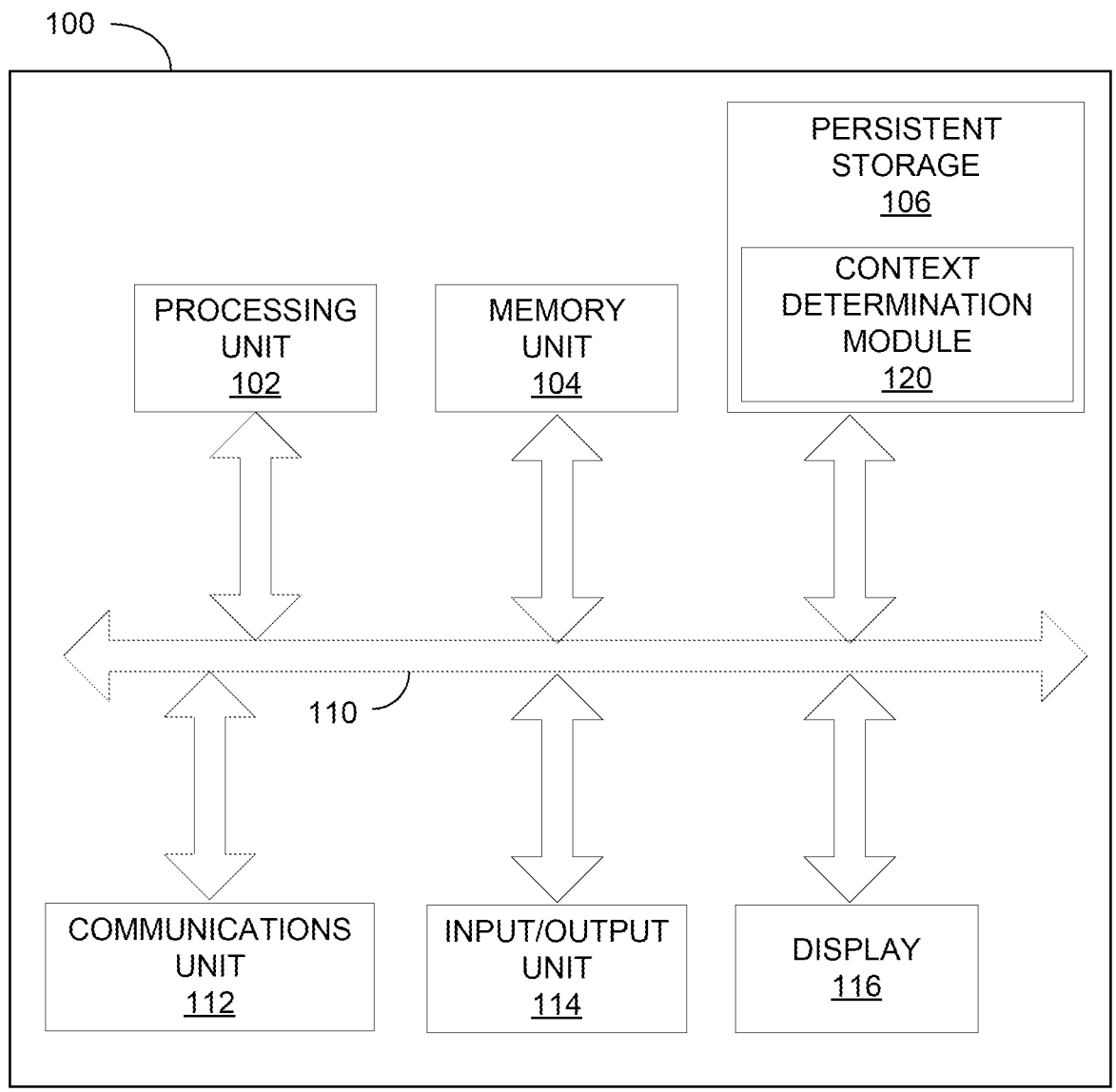
FIG. 1 depicts a block diagram of an example computer system in which various embodiments may be implemented.
Figure 2:
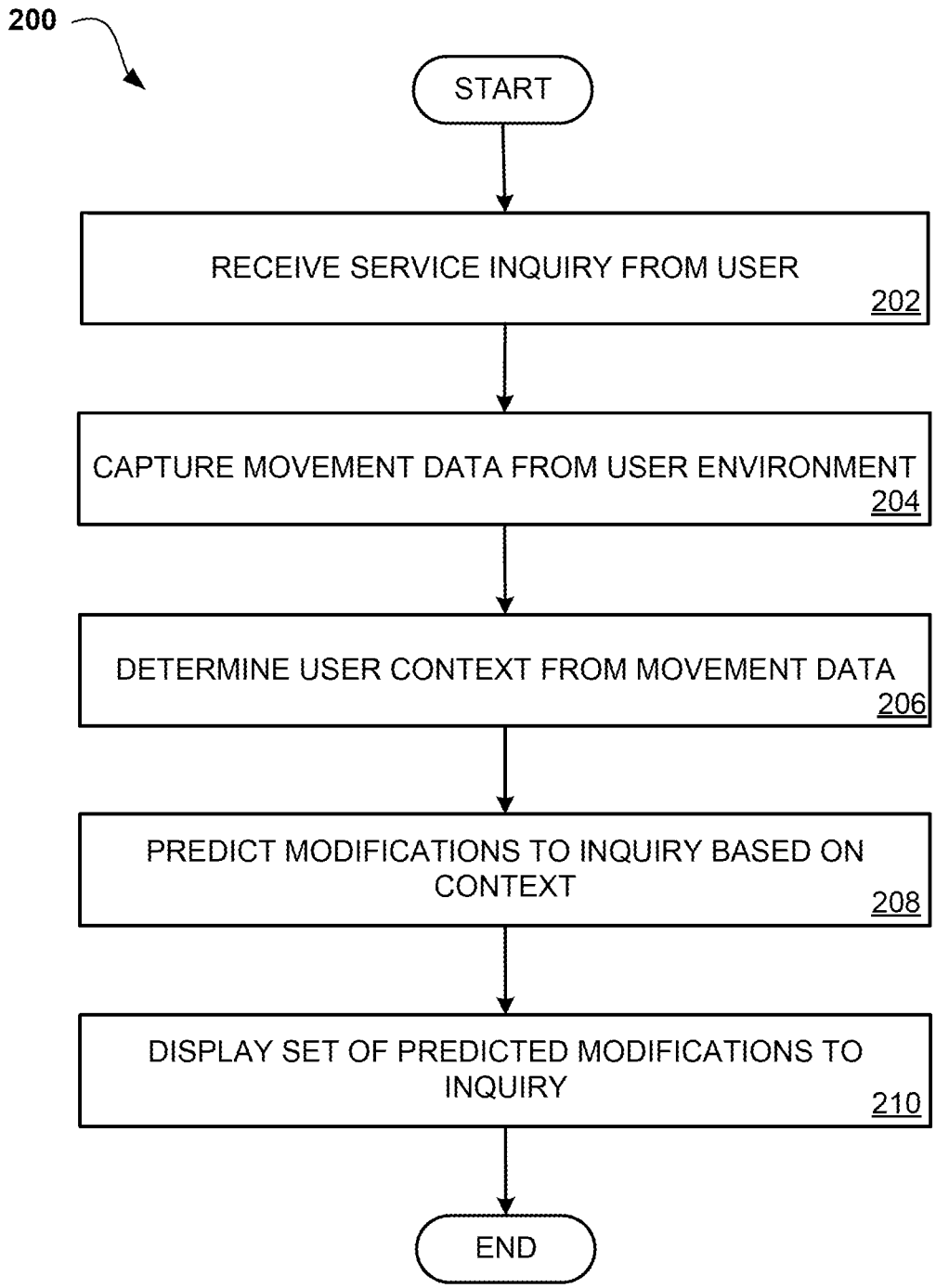
FIG. 2 depicts a flow chart diagram for a process to refine service inquiries through an understanding of user context according to an embodiment.

Today's electronic devices may access a large, growing, and diverse quantity of functions, services, and information, both through the Internet and from other sources. There may continue to be a rapid increase in functionality for such devices, as many consumer devices, smartphones, tablet computers, and the like, may run software applications to perform various tasks and provide different types of information. For instance, voice recognition may be commonly used to monitor the sound in the environment for a trigger word, e.g., "Hey Siri!" or "Alexa!" or "Watson!", and, once the trigger is recognized, perform more intelligent and advanced services for users, e.g., searching and purchasing a specific product or analyzing driving conditions and assisting in route selection, based on specific preferences. These services may be accessed through a local server that supports voice recognition and may work with a remote server to fulfill the request. As an example, a user may ask a question about the best restaurant with a certain type of food in the city, or perhaps the closest restaurant or hotel to a current location. To fulfill this request, the user's voice may be captured, and the request analyzed locally but the local server may then refer to a server in the cloud and check against a central database of restaurants or hotels or whatever was requested. However, in many situations where a user wants to access these advanced services and systems, the conditions that may be present at the time the user attempts access may be relevant to the actual query that a user may enter. For instance, if a user wants to know about "dining options near me" or "the next stop ahead of me on the subway", it may be helpful for the service to understand the exact position, or location, of the user and also some detail of the movement of objects in the immediate environment of the user. Such motion may be defined in terms of allocentric motion, or the relative position and movement of objects to each other, and also egocentric motion, or the relative position and movement of the user with respect to the surrounding objects. Adding this user context to the information provided in a user query may assist in providing better services, or information that is more detailed and relevant to the user.

Therefore, it may be advantageous to provide a method for understanding the context of a user while making a service inquiry for the purpose of improving potential queries by the user to the suite of automated systems and services that may be relevant to the user. Such a method may learn the contextual situation of the user within the surrounding environment using cameras or microphones along with devices that may be detected and accessed over an "Internet of things" (IoT) network and also use object recognition algorithms or voice recognition to understand the environment. In addition to the physical surroundings, the environment may include any commands or queries that may have been submitted by the user, including prior searches that a user may have conducted. Such a method may produce a display of possible enhancements to an active user query, such as alternate words that may be used or more accurate information about the user's position or motion. This display may be directly entered as a new or replacement query to the service being accessed, if the user has enabled this feature, or may be presented to a user, who may then scan the list and decide whether to use an alternative or decline assistance and use the original query. In producing the list of possible alternatives, a prediction may be made of whether the additional context information is accurate and may be accepted by the user. The strength of this prediction may be used to rank the list, which may be ordered by the determined rank. Such a method and display may improve the quality of service being provided and also enhance the technical capabilities of connected services by improving the position and motion data that may be understood by the service.

Referring now to FIG. 1, there is shown a block diagram illustrating a computer system 100 which may be embedded in a cloud computing node 10 (FIG. 4) in accordance with an embodiment. In another embodiment, the computer system 100 may be embedded in a "smart phone" or other mobile device capable of being connected to a network and which may be equipped with a camera and a capability for determining location, e.g., a GPS transceiver. It should be appreciated that FIG. 1 provides only an illustration of one implementation and does not imply any limitations with regard to the environments in which different embodiments may be implemented. Many modifications to the depicted environments may be made based on design and implementation requirements.

As shown, a computer system 100 includes a processor unit 102, a memory unit 104, a persistent storage 106, a communications unit 112, an input/output unit 114, a display 116, and a system bus 110. Computer programs such as the conversational agent 120 may be stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor unit 102 gives to memory unit 104 along with a request to read and/or write. Usually, the reading and interpretation of an encoded instruction at an address causes the processor unit 102 to fetch a subsequent instruction, either at a subsequent address or some other address. The processor unit 102, memory unit 104, persistent storage 106, communications unit 112, input/output unit 114, and display 116 interface with each other through the system bus 110.

Examples of computing systems, environments, and/or configurations that may be represented by the computer system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. Communication between mobile devices may be accomplished via a network and respective network adapters or communication units 112. In such an instance, the communication network may be any type of network configured to provide for data or any other type of electronic communication. For example, the network may include a local area network (LAN), a wide area network (WAN), a virtual private network (VPN), a mobile or cellular telephone network, the Internet, or any other electronic communication system. The network may use a communication protocol, such as the transmission control protocol (TCP), the user datagram protocol (UDP), the internet protocol (IP), the real-time transport protocol (RTP) the Hyper Text Transport Protocol (HTTP), or a combination thereof.

It will be understood that context determination module 120 may be a stand-alone application loaded and running on a mobile device, as shown in FIG. 1, but may also be loaded and running on a cloud server which may be connected to the service provider or not. The module 120 is shown within the local computer system 100 for simplicity but this may not be required.

Figure 3:
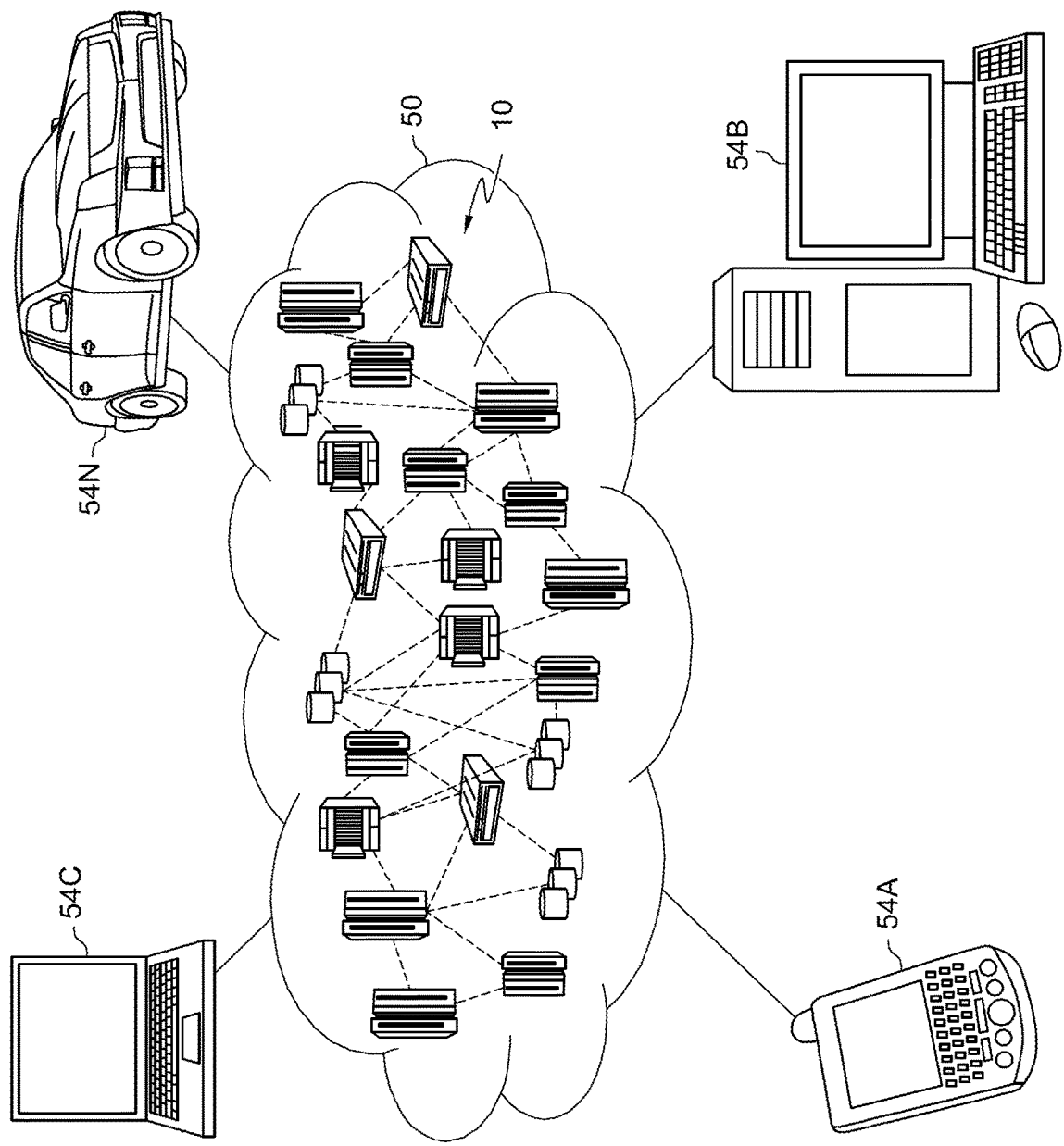
FIG. 3 depicts a cloud computing environment according to an embodiment.

Referring to FIG. 3, an operational flowchart illustrating a process 300 for refining service inquiries through an understanding of user context is depicted according to at least one embodiment. At 202, a service inquiry may be received from a user. One of ordinary skill in the art may recognize that there are multiple ways for a service inquiry to be entered. The user may speak into a microphone embedded in a mobile device that may be carried by the user and/or a text version of the service inquiry may be entered into a client application through speech to text conversion, among other methods. The user may also type directly into the client application with an appropriate input device. As an example, a user may be walking on the street and holding a mobile device, in which case the microphone may be embedded in the mobile device and the client application may also be loaded and running on the mobile device. However, it may also be understood that it is not required for the microphone to be embedded in the mobile device, only that the user may be heard such that a spoken query may be processed by a speech to text conversion algorithm. In other embodiments, the mobile device and microphone may be separate devices or may be functions that are combined into a single device or multiple devices.

A natural language processing (NLP) algorithm may be employed at this step so that the context determination module 120 may understand the meaning of the words that may be entered by the user and a word embedding may be defined for each of the words. One of ordinary skill in the art may recognize that in natural language processing algorithms, word embedding is a term used for the representation of words for text analysis, typically in the form of a real-valued vector that encodes the meaning of the word such that the words that are closer in the vector space are expected to be similar in meaning. Word embeddings may be obtained using a set of language modeling and feature learning techniques where words or phrases from the vocabulary are mapped to vectors of real numbers. Conceptually this method may involve the mathematical embedding from space with many dimensions per word to a continuous vector space with a much lower dimension. Some examples of methods to generate this mapping may include neural networks, dimensionality reduction on the word co-occurrence matrix, probabilistic models, explainable knowledge base method, and explicit representation in terms of the context in which words appear.

At 204, user movement data may be captured for a user from the environment that the context determination module 120 may determine is relevant to its processing. A physical position, or location, of the user, may be determined, e.g., through the capabilities of a mobile device, and the user movement data may take the form of audio and/or video data related to the user and the physical surroundings at the time that the service inquiry may be entered. From the audio and video data, information related to the allocentric and egocentric motion, as defined above, may be extracted and applied to the words of the service inquiry such that the context determination module 120 may understand the context in which the service inquiry has been entered and offer additional or alternative words to enhance or refine the service inquiry. For instance, the user may enter "show me the closest taxicabs in front of me". In this instance, the context determination module 120 may capture video from a camera from a mobile device, or perhaps a fixed camera that the context determination module 120 may detect nearby and, using computer vision techniques such as object recognition or the like, the context determination module 120 may determine the location and surroundings of the user, including specific details of the user's motion and the movements of objects in the surroundings.

In addition to audio or video data, the user movement data may take the form of telemetry data from devices that may be in proximity to the user. Once the position of the user is known, the context determination module 120 may be aware of other devices that may be connected to a network within a preconfigurable distance of the position that has been determined for the user. Alternatively, the context determination module 120 may use object recognition techniques to recognize devices in the audio or video data and then may attempt to access these devices for telemetry data that may be relevant to its determination of user context.

It is important to note that any monitoring and collection of personal data from a user as mentioned herein, including location or motion data as described or specific user details from a profile, requires the informed consent of all those people whose data is captured for analysis. Consent may be obtained in real time or through a prior waiver or other process that informs a subject that their data may be captured by appropriate devices or other sensitive personal data may be gathered through any means and that this data may be analyzed by any of the many algorithms that may be implemented herein. A user may opt out of any portion of the data collection and monitoring at any time.

At 206, a user context, or current state of the user and the environment, may be determined from the user movement data such that the context determination module 120 may understand the motion and position of both the user and the objects in proximity to the user, with the goal of improving the service inquiry originally entered by the user to account for the context. In the example above, to assist the service provider with accurately displaying "the taxicabs in front of me", it may be useful to know the specific location of the user but also if they are in a vehicle such as a train or airplane, in which case the motion of the vehicle may be useful to understand in framing a service inquiry to the service provider. In another example, there may be objects moving in the immediate proximity of the user, in which case it may be useful to understand that movement to assist the service provider. A machine learning model may be used that may determine context from audio, video and device telemetry data that may be relevant to the allocentric and egocentric motion of the user in an environment when making a service inquiry.

At 208, the context determination module 120 may predict modifications to the service inquiry such that the service inquiry may be more precise, and the user may get more relevant and helpful search results from the service provider. In addition to suggestions that may add precision to the service inquiry, the model may predict further questions about a service inquiry. For instance, if a user has entered a service inquiry of "tell me about the latest movies in the theater", the model may predict that the user wants to know the most popular movie in current release or perhaps if there is a certain genre, e.g., western or film noir, of movie playing nearby. This prediction may be based on the user context that has been determined, e.g., the position and motion of the user. For instance, if the user is travelling on a street in a certain direction, the user context may include the field of view of the user such that the direction may be determined and added to the service inquiry, suggesting a predicted modification such as "tell me the newest movies playing nearest the intersection of Main and Center Street, facing east". However, in addition to considering user context, the prediction may also consider historical user information, e.g., personal preferences entered by a user manually or other information about the user, in the model's possession about the user, such as movies or theaters preferred by the user or visited by the user in the past. Such historical user information may be gathered from a user profile or other method of understanding relevant attributes of a user, such as learned prior behavior of the user. At this step, the context determination module 120 may make multiple predictions of how to modify the service inquiry and, in addition, indicate its confidence in the prediction through a confidence score assigned to each suggested modification that is predicted.

In both of steps 206 and 208, a supervised machine learning model may be trained, as in 206, to determine a user context, or current state, from motion and position data such as the user movement data referenced above, or trained, as in 208, to predict how a service inquiry may be modified based on the user context, or current state, of the user when entering a service inquiry. One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include any of the types of data, e.g., prior service inquiries from the user or other users along with video and audio of the location and motion of the prior users. The training data may be captured from individual users or groups of users, with user consent required prior to any data capture. The results of the training process may be stored in a database so that the data may be most current, and the output would always be up to date.

At 210, the set of suggested modifications to the service inquiry that has been predicted may be displayed to the user. This display may have a hierarchical structure, such that the user may drill up or drill down on the display and manually select whether the prediction accurately reflects the user's requirements in making the service inquiry. The hierarchical structure may be an information tree, with more general details about the service inquiry, such as a certain service provider or perhaps a generalized service, such as "the latest new movies" or "taxicab providers", occupying the highest level, or root, of the tree. Further details such as "best reviewed movies" or a genre may occupy the next level, with each level adding more detail. In providing this hierarchical structure, the display may also use distinct visual indications that may be connected to the confidence in the prediction that may be displayed to the user. For instance, the modification with the highest confidence score, indicating that the context determination module 120 has the most confidence in the prediction, may be displayed in a distinctive color or font, or with other distinct graphics. One of ordinary skill in the art will recognize that there are several ways to distinctly indicate specific items in a display. From this display, a user may select a modification that appears in the display, in which case the suggested modification may be merged with the original service inquiry to form a modified service inquiry that may be transmitted to the service provider either in addition to the original service inquiry or instead of the original service inquiry. In selecting the modification, a user may provide feedback to the machine learning models that may determine user context or predict modifications to the service inquiry, with the goal of refining the predictions and adjusting the confidence score given to individual predictions.

In predicting suggested modifications to the service inquiry and displaying the hierarchical structure for the display, the user profile referenced above may be used in both the assigning of a confidence score to a certain predicted modification to a service inquiry and displaying the predicted modification within a hierarchical structure. Because the levels of the hierarchical structure may indicate more or less detail about the service inquiry and predicted modifications, the placement of suggestions within the structure may be directly affected by the personal information gathered about the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
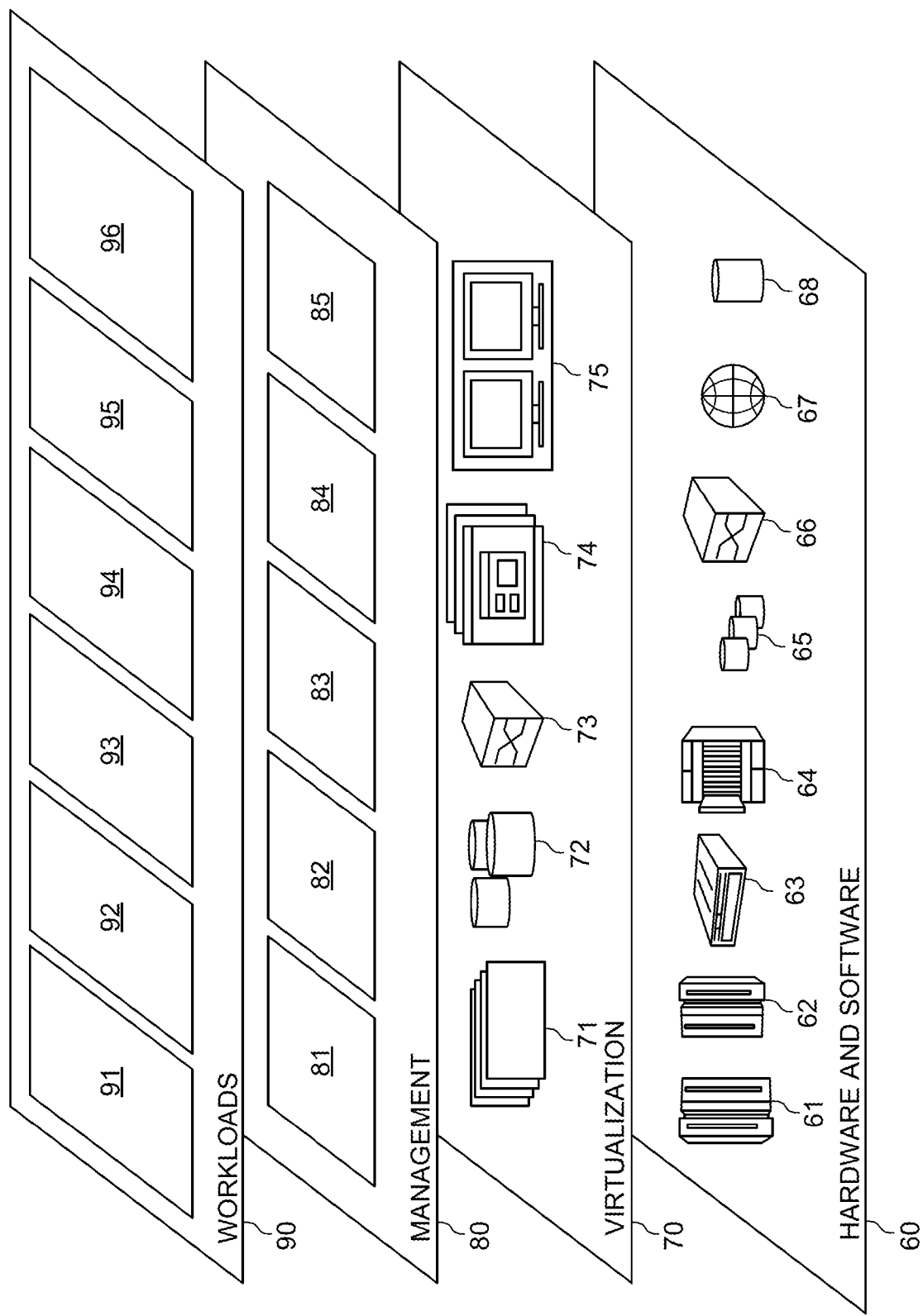
FIG. 4 depicts abstraction model layers according to an embodiment.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and processing of service inquiries by considering context 96. Processing of service inquiries by considering context 96 may refer to receiving service inquiries to computing services from a user, learning the context of the environment in which the user makes the service inquiry, and then offering possible changes to the individual service inquiries that reflect the learned context as understood by the process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for refining service inquiries through an understanding of user context, the computer-implemented method comprised of:
   receiving a service inquiry from a user on a computing device;
   capturing movement data within a user environment, wherein the movement data is selected from a group consisting of: audio data, video data and telemetry data extracted from a second device in the user environment;
   determining a user context by correlating motion and position of the user with respect to the user environment;
   generating a set of predicted modifications to the service inquiry based on the user context; and
   displaying the set of predicted modifications to the service inquiry on the computing device.

2. The computer-implemented method of claim 1, wherein determining the user context further comprises:
   identifying an object that is detected within a preconfigurable distance of the computing device using an object recognition algorithm; and
   correlating motion and position of the object with respect to the user.

3. The computer-implemented method of claim 1, further comprising:
   monitoring user interactions with the displayed set of predicted modifications to the service inquiry; and
   in response to the user selecting a predicted modification to the service inquiry from the set of predicted modifications, transmitting a modified service inquiry to a server, wherein the modified service inquiry merges the selected predicted modification with the service inquiry.

4. The computer-implemented method of claim 1, wherein displaying the set of predicted modifications to the service inquiry further comprises:
   determining a confidence score for each predicted modification to the service inquiry in the set of predicted modifications; and
   generating a display of the set of predicted modifications, wherein the display includes a distinct visual indication associated with the predicted modification to the service inquiry in the set having a highest confidence score.

5. The computer-implemented method of claim 4, further comprising:
   receiving a user profile, wherein the user profile includes historical user information relevant to the service inquiry;
   determining a relationship between the predicted modification and the historical user information; and
   updating the confidence score of the predicted modification to the service inquiry based on the relationship.

6. The computer-implemented method of claim 5, wherein displaying the set of predicted modifications comprises arranging the set in a hierarchical structure based on the historical user information in the user profile.

7. The computer-implemented method of claim 1, wherein a reinforcement machine learning model that predicts modifications to queries based on motion and position of items and objects in an environment is used for generating the set of predicted modifications to the service inquiry.

8. A computer system for refining service inquiries through an understanding of user context, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
      receiving a service inquiry from a user on a computing device;
      capturing movement data within a user environment, wherein the movement data is selected from a group consisting of: audio data, video data and telemetry data extracted from a second device in the user environment;
      determining a user context by correlating motion and position of the user with respect to the user environment;
      generating a set of predicted modifications to the service inquiry based on the user context; and
      displaying the set of predicted modifications to the service inquiry on the computing device.

9. The computer system of claim 8, wherein determining the user context further comprises:
   identifying an object that is detected within a preconfigurable distance of the computing device using an object recognition algorithm; and
   correlating motion and position of the object with respect to the user.

10. The computer system of claim 8, further comprising:
    monitoring user interactions with the displayed set of predicted modifications to the service inquiry; and
    in response to the user selecting a predicted modification to the service inquiry from the set of predicted modifications, transmitting a modified service inquiry to a server, wherein the modified service inquiry merges the selected predicted modification with the service inquiry.

11. The computer system of claim 8, wherein displaying the set of predicted modifications to the service inquiry further comprises:
    determining a confidence score for each predicted modification to the service inquiry in the set of predicted modifications;
    generating a display of the set of predicted modifications, wherein the display includes a distinct visual indication associated with the predicted modification to the service inquiry in the set having a highest confidence score.

12. The computer system of claim 11, further comprising:
    receiving a user profile, wherein the user profile includes historical user information relevant to the service inquiry;
    determining a relationship between the predicted modification and the historical user information; and
    updating the confidence score of the predicted modification to the service inquiry based on the relationship.

13. The computer system of claim 12, wherein displaying the set of predicted modifications comprises arranging the set in a hierarchical structure based on the historical user information in the user profile.

14. The computer system of claim 8, wherein a reinforcement machine learning model that predicts modifications to queries based on motion and position of users and objects in an environment is used for generating the set of predicted modifications to the service inquiry.

15. A computer program product for refining service inquiries through an understanding of user context, the computer program product comprising:
    a computer readable storage device having program instructions embodied therewith, the program instructions executable by a processor to cause the processor to perform a method comprising:
       receiving a service inquiry from a user on a computing device;
       capturing movement data within a user environment, wherein the movement data is selected from a group consisting of: audio data, video data and telemetry data extracted from a second device in the user environment;
       determining a user context by correlating motion and position of the user with respect to the user environment;
       generating a set of predicted modifications to the service inquiry based on the user context; and
       displaying the set of predicted modifications to the service inquiry on the computing device.

16. The computer program product of claim 15, wherein determining the user context further comprises:
    identifying an object that is detected within a preconfigurable distance of the computing device using an object recognition algorithm;
    correlating motion and position of the object with respect to the user.

17. The computer program product of claim 15, further comprising:
    monitoring user interactions with the displayed set of predicted modifications to the service inquiry; and
    in response to the user selecting a predicted modification to the service inquiry from the set of predicted modifications, transmitting a modified service inquiry to a server, wherein the modified service inquiry merges the selected predicted modification with the service inquiry.

18. The computer program product of claim 15, wherein displaying the set of predicted modifications to the service inquiry further comprises:
   determining a confidence score for each predicted modification to the service inquiry in the set of predicted modifications;
   generating a display of the set of predicted modifications, wherein the display includes a distinct visual indication associated with the predicted modification to the service inquiry in the set having a highest confidence score.

19. The computer program product of claim 18, further comprising:
   receiving a user profile, wherein the user profile includes historical user information relevant to the service inquiry;
   determining a relationship between the predicted modification and the historical user information; and
   updating the confidence score of the predicted modification to the service inquiry based on the relationship.

20. The computer program product of claim 19, wherein displaying the set of predicted modifications comprises arranging the set in a hierarchical structure based on the historical user information in the user profile.

* * * * *